(12) United States Patent
Baxivanelis et al.

(10) Patent No.: US 8,640,347 B2
(45) Date of Patent: Feb. 4, 2014

(54) HAND-OPERATED JIGSAW

(75) Inventors: Konstantin Baxivanelis, Kaufering (DE); Michael Weber, Eichenau (DE); Guenter Haas, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 227 days.

(21) Appl. No.: 12/608,814

(22) Filed: Oct. 29, 2009

(65) Prior Publication Data
US 2010/0107427 A1 May 6, 2010

(30) Foreign Application Priority Data
Oct. 31, 2008 (DE) .......................... 10 2008 043 375

(51) Int. Cl.
*B27B 19/00* (2006.01)

(52) U.S. Cl.
USPC .......................................................... 30/392

(58) Field of Classification Search
USPC ........ 30/392–394; 74/22 R, 22 A, 44, 50, 49, 74/61; 83/615, 632
See application file for complete search history.

(56) References Cited

U.S. PATENT DOCUMENTS

| | | | | |
|---|---|---|---|---|
| 5,212,887 A * | 5/1993 | Farmerie | .......................... | 30/393 |
| RE35,258 E * | 6/1996 | Palm | .......................... | 30/392 |
| 5,964,039 A * | 10/1999 | Mizoguchi et al. | .......................... | 30/392 |
| 6,698,177 B1 * | 3/2004 | Akehi et al. | .......................... | 74/440 |
| 7,047,647 B1 * | 5/2006 | Muller et al. | .......................... | 30/392 |
| 7,114,259 B2 * | 10/2006 | Wang | .......................... | 30/392 |
| 7,191,847 B2 * | 3/2007 | Haas | .......................... | 30/394 |
| 7,216,433 B2 * | 5/2007 | Haas et al. | .......................... | 30/393 |
| 7,246,533 B2 * | 7/2007 | Lagaly et al. | .......................... | 74/44 |
| 7,350,302 B2 * | 4/2008 | Imai et al. | .......................... | 30/393 |
| 7,363,713 B2 * | 4/2008 | Hirabayashi et al. | .......................... | 30/392 |
| 7,506,447 B2 * | 3/2009 | Wheeler et al. | .......................... | 30/392 |
| 7,658,012 B2 * | 2/2010 | James et al. | .......................... | 30/392 |
| 7,793,420 B2 * | 9/2010 | Griep et al. | .......................... | 30/394 |
| 7,996,996 B2 * | 8/2011 | Hirabayashi | .......................... | 30/392 |
| 8,141,257 B2 * | 3/2012 | Haas | .......................... | 30/392 |
| 2002/0170186 A1 * | 11/2002 | Sakaguchi | .......................... | 30/394 |
| 2004/0117993 A1 * | 6/2004 | Armstrong | .......................... | 30/392 |
| 2004/0187323 A1 * | 9/2004 | Hartmann | .......................... | 30/392 |
| 2005/0016001 A1 * | 1/2005 | Griep et al. | .......................... | 30/394 |
| 2005/0022395 A1 * | 2/2005 | Hirabayashi | .......................... | 30/392 |
| 2011/0239474 A1 * | 10/2011 | Hirabayashi | .......................... | 30/392 |
| 2011/0265335 A1 * | 11/2011 | Bantle et al. | .......................... | 30/394 |

FOREIGN PATENT DOCUMENTS

| | | | |
|---|---|---|---|
| CN | 101722335 A | * | 6/2010 |
| DE | 10235908 A1 | * | 2/2004 |
| DE | 102008002212 A1 | * | 12/2009 |

(Continued)

*Primary Examiner* — Jason Daniel Prone
(74) *Attorney, Agent, or Firm* — Crowell & Moring LLP

(57) ABSTRACT

A hand-operated jigsaw is disclosed. The reciprocating drive mechanism has a reciprocating body which can be put into a reciprocating motion along an axis via an eccentric of an eccentric wheel that can be set in motion by the motor. The eccentric wheel is arranged on a pivot bearing axis. The reciprocating drive mechanism has an additional mass with a mass center of gravity to minimize vibrations. The additional mass is arranged in a rotationally fixed manner with the eccentric wheel on the pivot bearing axis. An eccentric axis of the eccentric lies on a first radial of the pivot bearing axis, which is offset from a second radial in the operating direction of rotation of the eccentric wheel at an angle of between 190° and 270°, which second radial lies between the mass center of gravity of the additional mass and the pivot bearing axis.

3 Claims, 2 Drawing Sheets

(56) References Cited

FOREIGN PATENT DOCUMENTS

| | | | |
|---|---|---|---|
| DE | 102008043375 A1 | * | 5/2010 |
| EP | 0 561 473 B1 | | 9/1993 |
| EP | 1442813 A2 | * | 8/2004 |
| JP | 06198601 A | * | 7/1994 |
| JP | 2004066826 A | * | 3/2004 |
| JP | 2004237442 A | * | 8/2004 |
| JP | 2005014111 A | * | 1/2005 |
| JP | 2005052895 A | * | 3/2005 |
| JP | 2009291934 A | * | 12/2009 |
| SE | 533628 C2 | * | 11/2010 |

* cited by examiner

HAND-OPERATED JIGSAW

This application claims the priority of German Patent Document No. 10 2008 043 375.6., filed Oct. 31, 2008, the disclosure of which is expressly incorporated by reference herein.

BACKGROUND AND SUMMARY OF THE INVENTION

The invention relates to a hand-operated jigsaw. These types of jigsaws are embodied, for example, as all-purpose saws.

Known from European Patent Document No. EP 0 561 473 B1, which is the point of departure of the present invention, is a generic electric hand-operated jigsaw with a drive arrangement for producing a pendulum action. The drive arrangement includes a reciprocating drive mechanism for a reciprocating body embodied as a reciprocating rod. A tool receptacle for a saw blade is fixed on a free end of the reciprocating body in this case. The reciprocating drive mechanism comprises an eccentric wheel embodied as a bevel gear, on which an eccentric pin is arranged, which engages on the reciprocating body. To counterbalance the vibrations generated during operation of the jigsaw, a counterbalancing mass that is operated in a reciprocating motion is provided, which is put into a reciprocating motion that is phase-offset by 180° to the reciprocating motion of the reciprocating body via the eccentric drive mechanism along a movement axis defined by the reciprocating body.

The disadvantage of this known jigsaw is its high weight, which is caused by providing the counterbalancing mass and the additional components required for it.

The objective of the present invention is developing a jigsaw of the aforementioned type that has a lower weight and is simultaneously able to reduce vibrations well.

Accordingly, the additional mass is arranged in a rotationally fixed manner with the eccentric wheel on the pivot bearing axis, wherein an eccentric axis of the eccentric lies on a first radial of the pivot bearing axis, which is offset from a second radial, which lies between the mass center of gravity of the additional mass and the pivot bearing axis, in the operating direction of rotation of the eccentric wheel at an angle of between 190° and 270°. This permits, for one, a lower total weight to be achieved, because it is possible to dispense with additional components such as, for example, guiding means for an axially guided additional mass. Furthermore, the additional mass itself can have a lower weight as compared to an axially guided additional mass, wherein, through the co-rotating additional mass which is offset at an angle from the eccentric, a maximum compensation for the vibrations in both vector directions of the plane spanning through the housing and the main hand grip is achieved.

The angle between the first radial and the second radial is advantageously between 195° and 225°, thereby further optimizing the compensation for the vibrations.

In an embodiment that is simple in terms of manufacturing, the additional mass is embodied as one piece with the eccentric wheel, whereby a cost reduction can be achieved.

An improvement in the compensation for vibrations can also be achieved if the eccentric wheel, which spans a plane, is oriented with this plane parallel to a housing plane defined by the housing and the main hand grip.

The invention is depicted in an exemplary embodiment in the drawings.

DETAILED DESCRIPTION OF THE DRAWINGS

Figure 1:
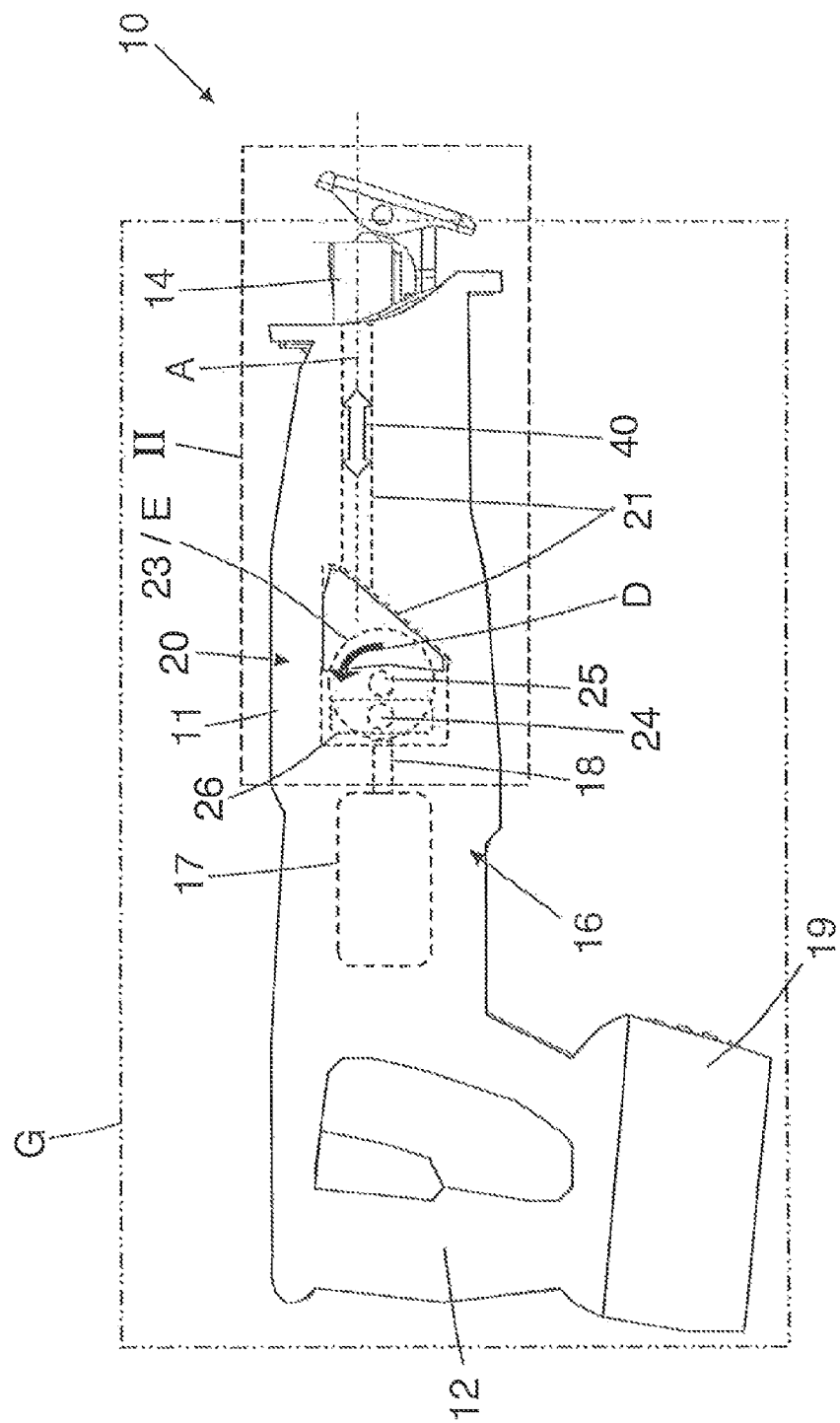
FIG. 1 illustrates an exemplary embodiment of the hand-operated jigsaw of the present invention.
Figure 2:
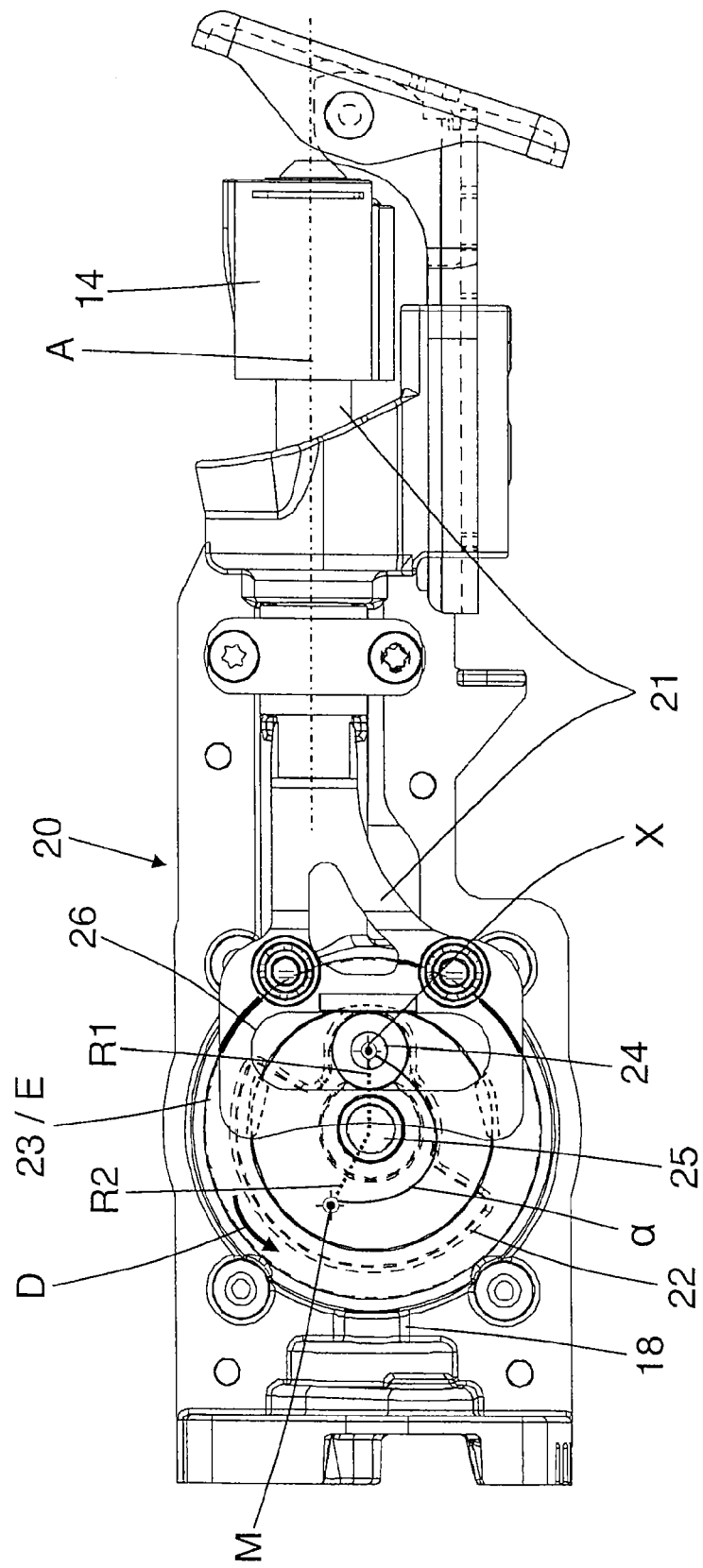
FIG. 2 is an enlarged view of a portion of the jigsaw identified by Roman numeral II in FIG. 1.

FIGS. 1 and 2 depict an inventive, hand-operated jigsaw 10 embodied as an all-purpose saw, in which a drive arrangement designated overall by 16 is arranged in a single-part or multi-part housing 11. The drive arrangement 16 includes a motor 17, such as, for example, an electric motor, and a reciprocating drive mechanism 20 for converting a rotational movement of the motor 17 into a reciprocating motion of a, for example, reciprocating body 21 embodied as a reciprocating rod. The power is supplied to the jigsaw 10 via battery arrangement 19. Naturally, as an alternative, power can also be supplied via the power network by means of a power cable that can be connected to the power supply.

Furthermore, a main hand grip 12 is embodied on the jigsaw 10 on which a switching means for actuating the jigsaw 10 is located. On the end of the jigsaw 10, opposite from the main hand grip 12, is a tool receptacle 14 at which a tool, such as for example, a saw blade, can be fixed. The tool receptacle 14 in this case is arranged on the free end of the reciprocating body 21.

The reciprocating drive mechanism 20 comprises a transmission element embodied as an eccentric wheel 23, which meshes, for example, by means of a toothed ring with a motor drive element 18 of the motor 17, such as for example, a driven tooth wheel. The eccentric wheel 23 in this case is positioned in a rotationally movable manner in a bearing receptacle (not shown here) via a pivot bearing axis 25. Arranged on the eccentric wheel 23 is an eccentric 24, which projects on one side of the eccentric wheel 23 from the same.

The reciprocating body 21 has on its end region facing away from the tool receptacle 14 a longish connecting link 26, which runs transverse to the longitudinal extension of the reciprocating body 21. The eccentric 24 of the eccentric wheel 23 engages in this connecting link 26 so that the reciprocating body 21 can be put into a back-and-forth motion (indicated by the double arrow 40) along the axis A, when the motor 17 is turned on and generates a rotational movement of the eccentric wheel 23 in the operating direction of rotation D. The eccentric wheel 23 spans a plane E, and with this plane E lies parallel to a housing plane G spanned by the housing 11 with the main hand grip 12.

Arranged on the pivot bearing axis 25 to minimize vibrations is an additional mass 22, which is embodied as one piece with the eccentric wheel 23 in the depicted embodiment. Alternatively, the additional mass 22 could also be designed as a separate part, which however, is firmly connected or connected in a rotationally fixed manner with the eccentric wheel 23 in order to be able rotate synchronously with the same.

The additional mass 22 has a mass center of gravity M. The mass center of gravity M of the additional mass 22 in this case lies on a second radial R2 of the pivot bearing axis 25. The eccentric 23 defines an eccentric axis X, which lies on a first radial R1 of the pivot bearing axis 25. The first radial R1 lies offset from the second radial R2 in the operating direction of rotation D of the eccentric wheel 23 at an angle α of between 190° and 270°, in particular of between 195° and 225°. The mass center of gravity M is thus offset from the eccentric axis X on the plane E defined by the eccentric wheel 23 in the operating direction of rotation D of the eccentric wheel 23 at the angle α of between 190° and 270°, in particular of between 195° and 225°. The eccentric 24 thus runs ahead of the mass center of gravity M in the operating direction of rotation D.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A hand-operated jigsaw, comprising:
   a housing with a main hand grip attached to the housing; and
   a reciprocating drive mechanism operable via a motor;
   wherein the reciprocating drive mechanism includes a reciprocating body which is operable in a reciprocating motion along an axis via an eccentric of an eccentric wheel, wherein the eccentric wheel is arranged to rotate about a pivot axis oriented so that the eccentric wheel rotates in a plane that lies parallel to a housing plane extending through the housing, the main grip attached to the housing, and a battery arrangement securable to the main grip;
   wherein the reciprocating drive mechanism further includes an additional mass with a mass center of gravity, wherein the additional mass is embodied as one piece with, firmly connected to, or connected so as to be rotationally fixed with respect to the eccentric wheel on the pivot axis and minimizes vibrations; and
   wherein a center axis of the eccentric lies on a first radial of the pivot axis and is parallel to the pivot axis, wherein the first radial is offset from a second radial in an operating direction of rotation of the eccentric wheel at an angle of between 190° and 270°, and wherein the second radial lies between the mass center of gravity of the additional mass and the pivot axis.

2. The jigsaw according to claim 1, wherein the angle is between 195° and 225°.

3. The jigsaw according to claim 1, wherein the additional mass is embodied as one piece with the eccentric wheel.

* * * * *